(12) United States Patent
Pelegrin

(10) Patent No.: US 9,061,696 B2
(45) Date of Patent: Jun. 23, 2015

(54) BICYCLE TRANSPORT CASE

(71) Applicant: Robert J. Pelegrin, Redondo Beach, CA (US)

(72) Inventor: Robert J. Pelegrin, Redondo Beach, CA (US)

(*) Notice: Subject to any disclaimer, the term of this patent is extended or adjusted under 35 U.S.C. 154(b) by 0 days.

(21) Appl. No.: 14/208,326

(22) Filed: Mar. 13, 2014

(65) Prior Publication Data

US 2014/0265196 A1 Sep. 18, 2014

Related U.S. Application Data

(60) Provisional application No. 61/785,189, filed on Mar. 14, 2013.

(51) Int. Cl.
  *B65D 85/68* (2006.01)
  *B62B 3/04* (2006.01)

(52) U.S. Cl.
  CPC .......................................... *B62B 3/04* (2013.01)

(58) Field of Classification Search
  USPC .............. 280/47.34, 47.35, 79.11, 79.2, 79.7; 206/304, 335, 315.1, 577
  See application file for complete search history.

(56) References Cited

U.S. PATENT DOCUMENTS

| 2,339,947 | A |  | 1/1944 | Reaume |
| 4,016,686 | A |  | 4/1977 | Hartger et al. |
| 4,353,464 | A |  | 10/1982 | Bentler |
| 4,506,786 | A |  | 3/1985 | Buchanan et al. |
| 4,756,416 | A | * | 7/1988 | Johnson ........................ 206/335 |
| 4,792,039 | A | * | 12/1988 | Dayton ........................ 206/304 |
| 4,892,190 | A |  | 1/1990 | Delgado et al. |
| 4,991,715 | A | * | 2/1991 | Williams ...................... 206/335 |
| 5,669,497 | A |  | 9/1997 | Evans et al. |
| 8,196,740 | B2 | * | 6/2012 | Jacques et al. ................ 206/335 |

* cited by examiner

*Primary Examiner* — John Walters
(74) *Attorney, Agent, or Firm* — Rutan & Tucker LLP; John K. Fitzgerald

(57) ABSTRACT

A transport carrier or case for storing and/or transporting a partially disassembled bicycle is disclosed. The carrier includes means for mounting the partially disassembled bicycle to a base while providing for adjustment of the mounting means dependent on the size of the bicycle. Also disclosed are wheel retention means for releasably mounting the wheels of the bicycle to one side of the transport case, and isolation means to separate the bicycle frame from the wheels.

8 Claims, 6 Drawing Sheets

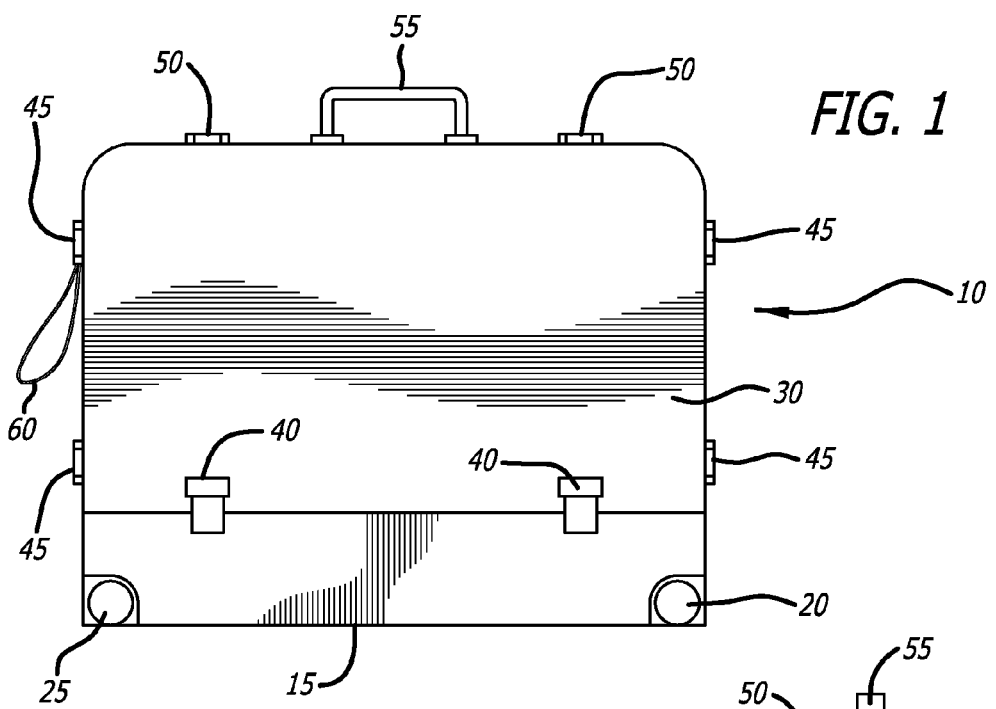
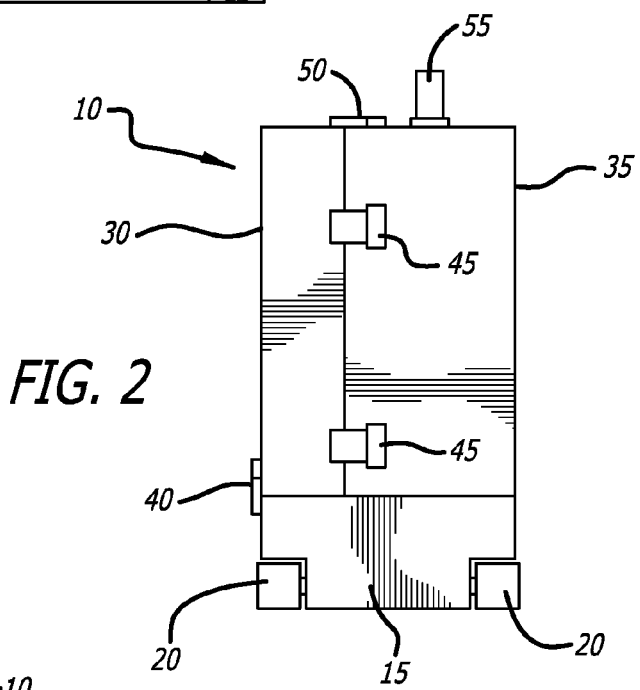
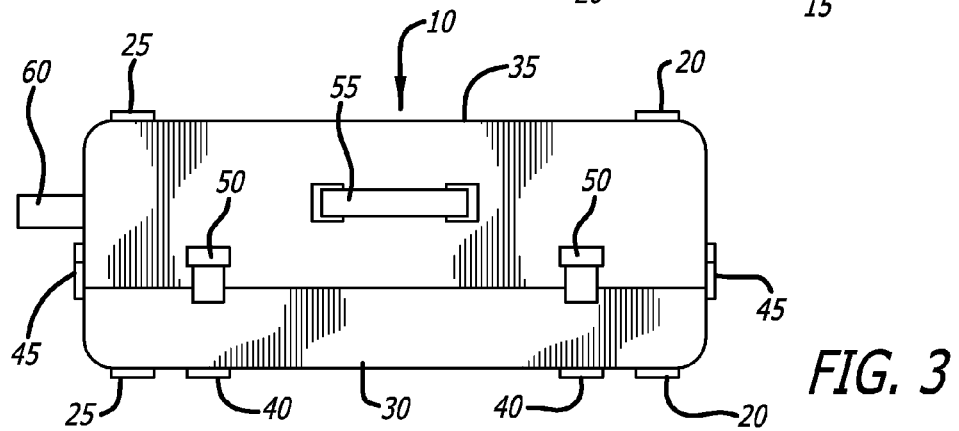

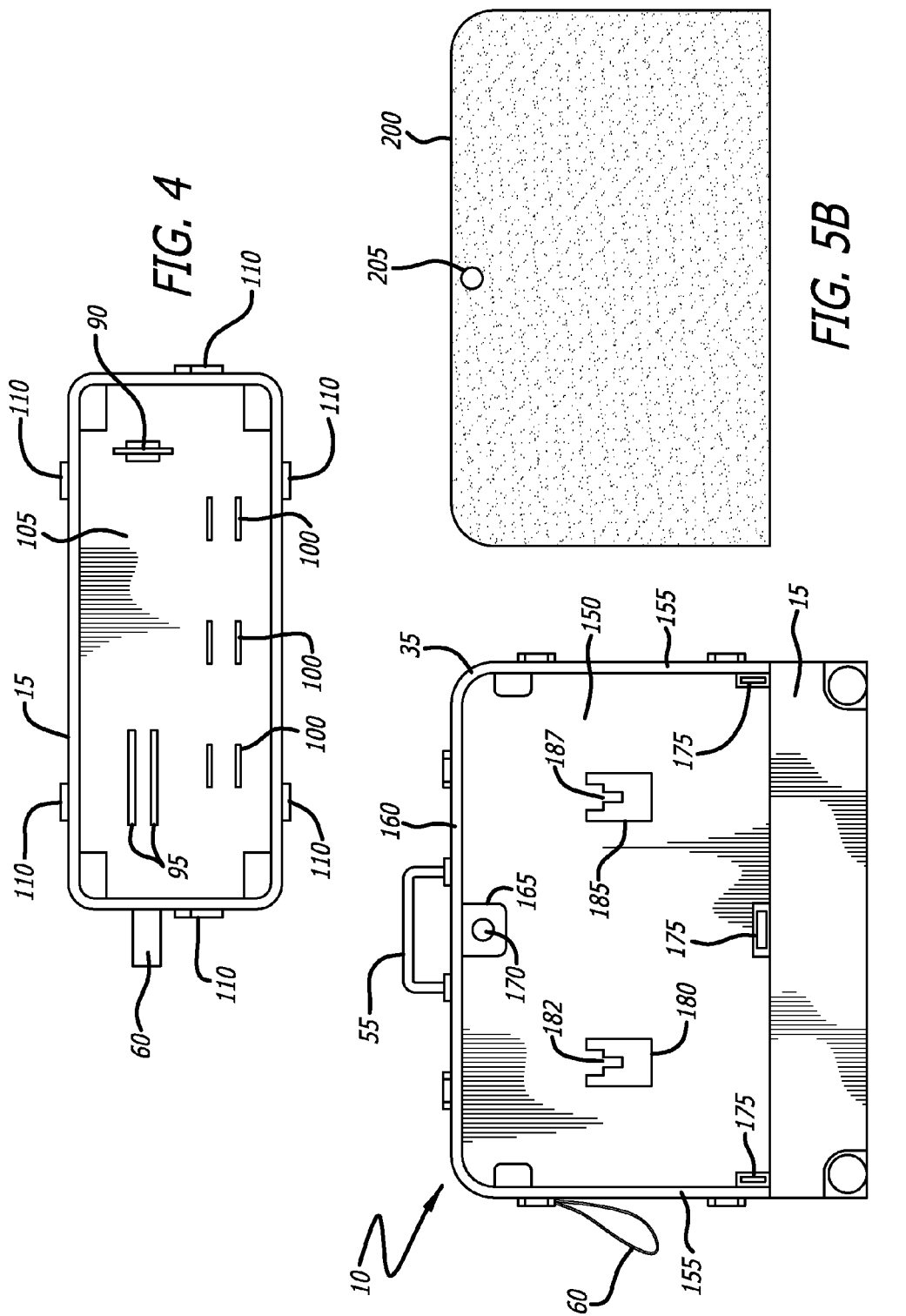

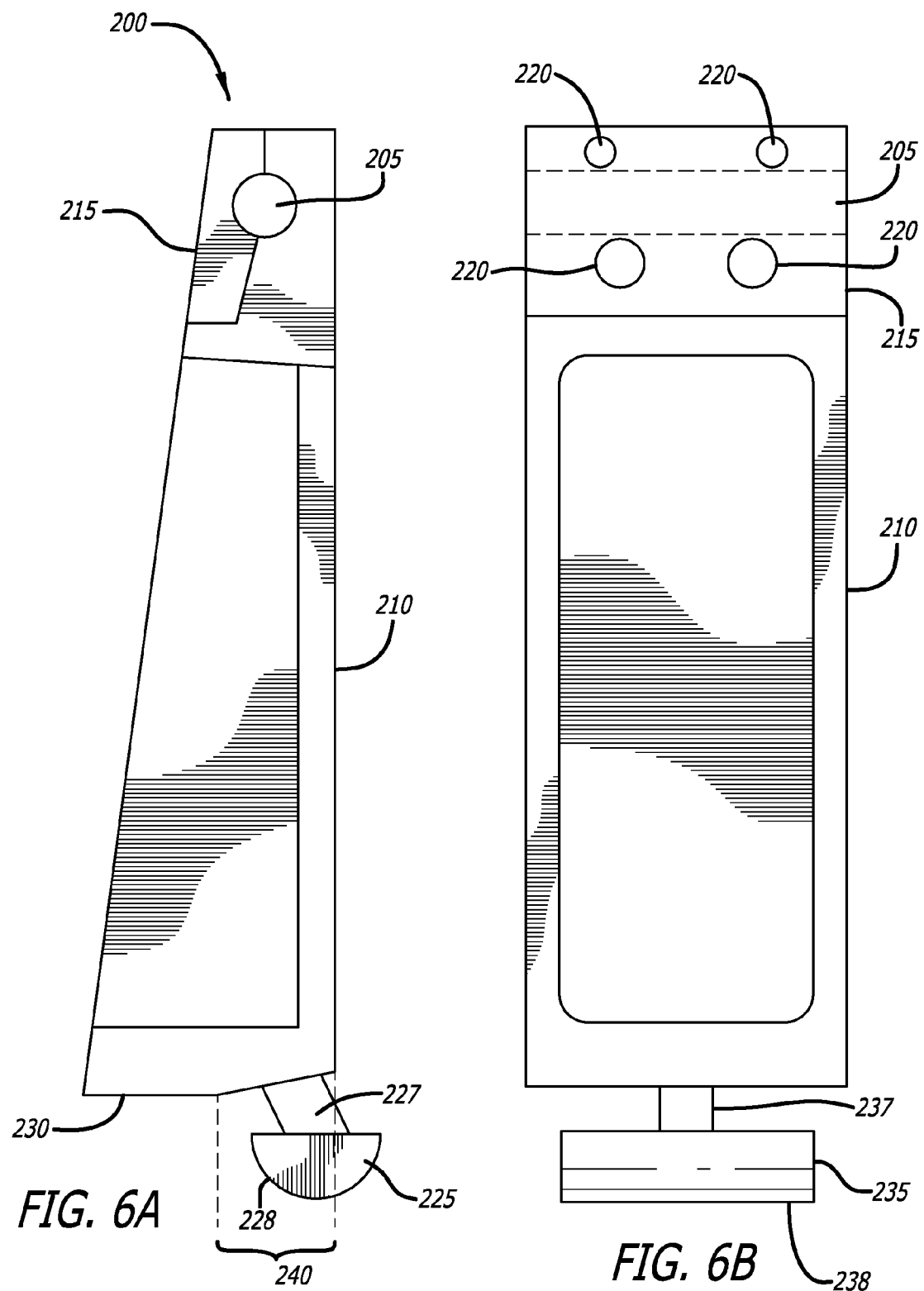

BICYCLE TRANSPORT CASE

CROSS-REFERENCES TO RELATED APPLICATIONS

This application claims priority from U.S. Application No. 61/785,189, filed Mar. 14, 2013 incorporated by reference in its entirety.

BACKGROUND

The present invention relates to a container and case for the storage and transport of a bicycle. More particularly, the invention relates to a container for storage and transport of a bicycle in partial disassembly.

In recent years, the popularization of lightweight bicycles has greatly increased sport and competitive usage of such machines, particularly bicycles especially designed with extremely lightweight frames and other components and intended for long distance riding. Such machines are constructed of lightweight metals or carbon fiber and are precision machined and balanced to provide maximum speed and range with minimum weight. Such machines are commonly provided with derailleur multi-speed mechanisms.

Unfortunately, as the weight of modern bicycles is reduced, and the precision machining features are increased, the bicycle mechanism becomes more fragile and susceptible to damage from abusive handling. Lightweight wheels and rims are susceptible to bending, and derailleur mechanisms are susceptible to misalignment.

Bicycle touring has also become popularized in recent years. One aspect of this sport involves the long distance touring of groups of bicyclists in places remote from their homes. Typically, the bicyclist transports himself and his machine to a remote starting point by auto, train, bus or airplane and engages in the sport of touring in regions remote from the bicyclist's home location. At the completion of such touring events the bicyclist and his machine are transported back to their home location.

In the normal and other usage of a modern lightweight bicycle great care must be taken for the storage and transport of the machine to avoid damage or destruction to the machine. Since machines of such precision have become extremely expensive and difficult to repair, a need has arisen for a container device which can safely store and transport a bicycle, even under the abusive handling conditions typically found in commercial airline service. Such a container must be more than a mere box for enclosing the bicycle, for it must be as compact as possible to conserve space during shipping, and it must protect the components of the bicycle from wear and damage caused when the frame of the bicycle contacts other bicycle components, such as the wheels of the bicycle, during transport.

Various configurations of bicycle cases have been developed. However, one problem that has not been satisfactorily addressed is the storage of the wheels for the bicycle. As can be imagined, the bicycle case should be designed to be as compact as possible while providing enough interior room to pack the bicycle safely and securely. Typically, the wheels of the bicycle are removed for shipment. Various configurations have been used to position the wheels alongside the bicycle to minimize the profile of the bicycle within the box or carrier. However, the rims and spokes of the bicycle often are left in contact with the frame or components of the bicycle, which may damage the bicycle or the wheels if the wheels shift during transport.

What has been needed and heretofore unavailable is a compact, light yet robust, carrier box and wheel transportation system providing for safe and easy shipment of a bicycle, while incorporating features, particularly with respect to storing the wheels, that prevent damage to the frame, wheels and other components of the bicycle during transport of the bicycle. The present invention satisfies these and other needs.

SUMMARY OF THE INVENTION

In its most general aspect, the present invention includes a bicycle transport case having a plurality of sides that are interconnectable to form a cavity in which a bicycle and its components may be securely mounted for transport.

In another aspect, the present invention includes a bicycle transport case, comprising: a base having at least two wheels mounted at a bottom surface at one end of the base for rolling the case across a surface, the base having a slot formed at one end of base; a fork mount mounted to the base, the fork mount configured to releasably engage the fork drop outs of a bicycle; a rear frame mount having a top end and a bottom end, the top end configured to engage the rear drop outs of a bicycle frame in a releasable manner, the bottom end configured to engage with the slot formed in the base to provide for movement of the rear frame mount to position the rear frame mount to accommodate different sizes of bicycle frames; at least one hook providing a tie down surface for securing accessories to the base; a first side releasably mountable to the base, the first side also having a pair of side panels and a top panel defining a cavity open on one side to partially enclose the bicycle mounted to the base by way of the fork mount and the rear frame mount; and a second side releasably mountable to the base, the second side also having a pair of side panels and a top panel defining a cavity open on one side to partially enclose the bicycle, the first and second sides cooperating to completely enclose the bicycle when the bicycle transport case is in a closed condition, the second side including wheel mounts for mounting the wheels of the bicycle to the second side, and also including a cushioning layer releasably mounted to the second side and disposed within the cavity to isolate the wheels from the bicycle mounted to the base.

In another aspect, the present invention includes a bicycle transport case, comprising: a base having at least two wheels mounted at a bottom surface at one end of the base for rolling the case across a surface; a fork mount mounted to the base, the fork mount configured to releasably engage the fork drop outs of a bicycle; a rear frame mount having a top end and a bottom end, the top end configured to engage the rear drop outs of a bicycle frame in a releasable manner, the bottom end of the rear frame mount movably mounted to the base to provide for movement of the rear frame mount to position the rear frame mount to accommodate different sizes of bicycle frames; at least one hook providing a tie down surface for securing accessories to the base; a first side releasably mountable to the base, the first side also having a pair of side panels and a top panel defining a cavity open on one side to partially enclose the bicycle mounted to the base; and a second side releasably mountable to the base, the second side also having a pair of side panels and a top panel defining a cavity open on one side to partially enclose the bicycle, the first and second sides cooperating to completely enclose the bicycle when the bicycle transport case is in a closed condition, the second side including at least one wheel mount for releasably mounting a wheel removed from the bicycle to the second side, and also include a cushioning layer releasably mounted to the second side and disposed within the cavity to isolate the wheel from the bicycle mounted to the base.

In one alternative aspect, the front fork mount is removably mounted to the base. In still another aspect, the base has a channel formed in a top surface of the base, the channel being configured to receive a head of a pin extending from a bottom end of the front fork mount, the head having a width dimension larger than a width dimension of the pin such that when the head of the pin in inserted into the channel, the channel engages the head to maintain the head in the channel while still allowing the pin to move in a longitudinal direction along the base to provide for adjustment of the front fork mount to accommodate different bicycle sizes.

In another aspect, the base has a channel formed in a top surface of the base, the channel being configured to receive a head of a pin extending from the bottom end of the rear frame mount, the head having a width dimension larger than a width dimension of the pin such that when the head of the pin in inserted into the channel, the channel engages the head to maintain the head in the channel while still allowing the pin to move in a longitudinal direction along the base to provide for adjustment of the rear frame mount to accommodate different bicycle sizes.

In a further aspect, the present invention may also include a wheel mount fixture configured to engage the wheel mount to hold the bicycle wheel in place within the transport case. In still another aspect, four wheels are mounted adjacent four corners of the base.

In still another aspect, the present invention includes a bicycle transport case, comprising: a base having at least two wheels mounted at a bottom surface at one end of the base for rolling the case across a surface; a fork mount slidably mounted to a top surface of the base, the fork mount configured to releasably engage the fork drop outs of a bicycle; a rear frame mount mounted to a top surface of the base and configured to engage the rear drop outs of a bicycle frame in a releasable manner; at least one hook providing a tie down surface for securing accessories to the base; a first side releasably mountable to the base, the first side also having a pair of side panels and a top panel defining a cavity open on one side to partially enclose the bicycle mounted to the base; and a second side releasably mountable to the base, the second side also having a pair of side panels and a top panel defining a cavity open on one side to partially enclose the bicycle, the first and second sides cooperating to completely enclose the bicycle when the bicycle transport case is in a closed condition, the second side including at least one wheel mount for releasably mounting a wheel removed from the bicycle to the second side, and also include a cushioning layer releasably mounted to the second side and disposed within the cavity to isolate the wheel from the bicycle mounted to the base.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 1 is frontal view of an embodiment of a bicycle transport case in accordance with principles of the present invention.

FIG. 2 is a side view of the bicycle transport case of FIG. 1.
FIG. 3 is a top view of the bicycle transport case of FIG. 1.
FIG. 4 is a top view looking down onto a base of the bicycle transport case of FIG. 1 illustrating one embodiment of the arrangement of various articles designed to hold a bicycle and its components within the case.

FIG. 5A is a front view of an interior of one side of the bicycle transport case of FIG. 1 shown mounted to the base of the bicycle transport case of FIG. 1.

FIG. 5B is a front view of a panel which may also include layer of foam that faces wheels mounted to the side of FIG. 5A to isolate the wheels from the remaining interior of the bicycle transport case.

FIG. 6A is side view of an embodiment of an assembly for providing an adjustable mount for holding the front fork of the bicycle to the base of the bicycle transport case of FIG. 1.

FIG. 6B is a front view of the fork mount embodiment of FIG. 6A.

DETAILED DESCRIPTION OF THE PREFERRED EMBODIMENTS

Figure 7A:
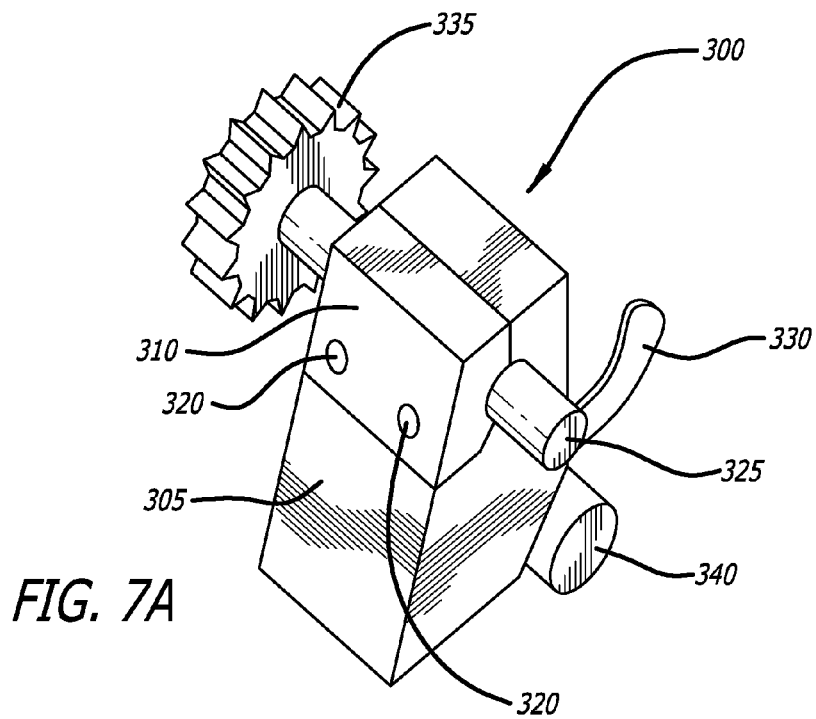
FIG. 7A is a perspective top view of an embodiment of an assembly in for providing an adjustable mount for holding the rear portion of the bicycle to the base of the bicycle transport case of FIG. 1, including one embodiment of a spindle assembly for holding the rear portion of the bicycle in place and for engaging a chain of the bicycle.

Referring now to the drawings in detail, in which like reference numerals indicate like or corresponding elements among the several figures, there is shown in FIGS. 1-3 a series of views of a one embodiment of a bicycle transport case 10 in accordance with the principles of the present invention. The case includes a base 15, a first side 30 and a second side 35 that removably attaches to the base using fasteners 40, 45, 50 of a type well known in the art.

As shown in the FIGS. 1-3, a pair of rear wheels 20 may be disposed at a bottom rear of the base 15 to facilitate movement of the base across a surface. In some embodiments, a pair of front wheels 25 may be disposed at a front end of base 15, resulting in the placement of wheels at all four corners of the base, as shown in the figures, so that the base may be freely rolled from one location to another. Those skilled in the art, however, will recognize that rollers may be substituted for the wheels, and that the case can be moved even if it only includes a single pair of wheels or a roller or rollers disposed at one end of the case, allowing the non-wheeled end to be tilted up and the case rolled on the wheeled end.

A handle or strap 60 may be mounted on one side of the case to assist in pulling the case over a surface. In an embodiment having only a pair or wheels mounted at one end of the base, the strap or handle would typically be mounted on the opposite end of the case relative to the wheels. One or more handles or straps 55 may also be mounted on a top surface of the case 10 to facilitate lifting of the case. In the embodiments shown, the handles or straps 55, 60 are shown mounted on the second side 35 of the case. Alternatively, they may be mounted on the first 30, or mounted on a combination of first and second sides. Of course, additional handles or straps may be mounted on the sides or side panels of the case without departing from the intended scope of the invention.

FIG. 2 illustrates how the exemplary embodiment includes both a first side 30 and second side 35 which releasably couple using couplers 45, 50 to each other to form a cavity that is configured to enclose a bicycle mounted to the base 15. Typically, as will be discussed in more detail below, the wheels of the bicycle are removed from the frame of the bicycle prior to mounting the bicycle within the case 10. Each of the first side 30 and second side 35 also include couplers to couple the respective sides to the base 15.

Each of the first and second sides 30, 35 has a height dimension, a length dimension and a width dimension, with the length dimension being approximately the same as a length dimension of the base. The sum of the width dimensions of the first and second sides approximates the width of the base, and the height dimension of the first and second sides are generally the same, and sufficient to enclose the height of a bicycle that is mounted to the base. Note, however, that the width dimensions of the first and second side may not be equal, and in some embodiments, will not be equal, as is shown in FIGS. 1-3.

Referring now to FIG. 4, details of the base 15 of the transport case are shown. The base 15 of the transport case includes various fixtures and assemblies configured to securely hold a bicycle frame, and in some embodiments, additional accessories, tools or other items securely within the case during shipment. As shown, the base includes a bottom 105, and low sides (See FIG. 1) that surround the circumference of the base to define a shallow cavity having bottom 105 at one end, and open above to allow placement of a bicycle onto the fixtures attached to bottom 105 of base 15. It will be understood, however, that the low sides are not necessary to the invention. All that is needed is that the base be configured to allow the first and second sides to mate with the base to form a cavity in which a bicycle may be mounted. The base also includes appropriate fixtures or fasteners 110 that cooperate with fixtures or fasteners 40 mounted to the first and second sides to secure the first and second sides to the base.

Base 15 is configured to allow attachment of various fixtures and assemblies configured to secure the bicycle to the base. In one embodiment, one or more slots 95 may be machined into a top surface of the bottom 105 of base in such as manner as to form a groove or grooves shaped to receive a pin having a head configured to be retained within the groove. An opening may be formed at one end of the groove to allow the pin to be inserted into the groove. In another embodiment, a pair of L-shaped or U-shaped rails (not shown) may be mounted to the base, the pair of rails cooperating such that a pin having shaft sized smaller than the width of the groove, and also having a head sized larger than the groove, but smaller than the separation between the interior of the rails, can be placed within the assembly, yet retained by the assembly.

In another embodiment, a second plate may be mounted over the bottom 105 of the base in such a manner that grooves may be formed in the second plate to accept the mounting pins of various fixtures, as will be described below.

In still another embodiment, various hooks, loops or other fasteners 100 may be affixed to the base to facilitate tying down various accessories, tools or other items, such as handle bars, seat/post, helmet, shoes, aero bars, pump, track sack, pedals, shoes or tools.

As shown, a rear dropout receiving assembly 90, also called a rear mounting assembly or rear dropout mount, as will be described in more detail with reference to FIGS. 7A-7C, may also be mounted on bottom 105 of base 15. The rear mounting assembly may be fixed in place, as shown, or may also be configured to engage one or more grooves or rails as discussed above to maintain the rear mounting assembly in place, yet allowing the rear mounting assembly to be moved forward and rearward to assist in accommodating different sized bicycles.

FIG. 5A is a side view of case 10 looking into the interior portion of the second side 35 when second side 35 is mounted to the base 15. As shown in FIGS. 1-3, second side 35 has a pair of raised side lips 155 and a top lip 160 that are joined to back panel 150 of the second side to define a cavity for accommodating a pair of bicycle wheels. In one embodiment, a tap 165 is mounted to the top edge, the tab having an opening 170 formed therein. In other embodiments, tab 165 may be a fastener or catch. Also mounted to the side lips are one or more fasteners 175, which may be one side of a hook and loop fastener, or may be one side of a magnet and plate fastener.

A pair of wheel mounts 180, 185 are mounted to back panel 150 and configured to receive at least a portion of an axel assembly of a bicycle wheel in such a manner so as to maintain the wheel in position relative to the wheel mount 180, 185 when the wheel is so mounted. Wheel mounts 180, 185 may be formed so as to hold and lock the axel in place, or they may be configured to be used with a quick release system, wherein the mount receives one end of bicycle quick release skewer, which when hand tightened by activating the cam of the skewer of the quick release, tightens the wheel against the wheel mount to releasably hold the wheel in place.

FIG. 5B is a side view of a protective panel 200 that is sized to fit within the area bounded by the inner walls of raised side lips 155 and top lip 160 and the top of the base. Protective panel 200 is typically fairly stiff, and may be coated on one or more sides with a protective material. A layer of compressible foam may also be attached to one or both sides of panel 200. In use, panel 200 is placed over the wheels once the wheels are mounted in wheel mounts 180, 185. In this manner, panel 200 isolates the wheels from the rest of the bicycle that is mounted to the base 15 of the transport case 10. The wheel side of panel 200 may also include one or more fasteners, such as the opposite side of hook and loop fastener system, or magnet and plate system. For example, where fastener 175 is a hook portion of a hook and loop system, the loop portion of the fastener system would be mounted on the wheel side of panel 200 so that when panel 200 is positioned over the wheels mounted to second side 35, the loop portion engages the hook portion to hold panel 200 in place. Of course, it does not matter whether the hook portion or the loop portion is mounted to the second side or the panel 200, as long as each portion engages the other to hold panel 200 in place. Those skilled in the art will understand that a hook and loop fastener system, or magnet and plate system have been described for example only, and that releasable fastener systems may be used without departing from the intended scope of the invention.

In one embodiment, panel 200 includes an opening 205 that allows for use of a finger or other instrument to be inserted to facilitate removal of panel 200 from its mounted position to expose the wheels of the bicycle. Opening 205 may also be used accommodate a releasable latching system, the hole being used to mount a locking mechanism such as a camlock that then cooperates with opening 170 (or an assembly disposed within hole 170) of tab 160 (FIG. 5A) to securely hold panel 200 in place.

In another embodiment, the second side may also include slots, brackets or other features such as rotatable tabs or latches to allow attachment of a panel to be removably mounted to the second side overlaying the attached wheels. In this manner the panel encloses the wheels within the cavity formed by the second side and its two side panels and top panel, and provides for separation of the wheels from the frame of the bicycle during shipment. The panel may be any suitable material, such as plastic, wood or wood product, metal or foam. In an alternative embodiment, the sides of the panel may include various hooks, loops or other fasteners to facilitate tying down various accessories, tools or other items.

FIGS. 6A and 6B illustrate embodiments of a front fork mount 200 that may be mounted to the base 15 to secure the front fork of a bicycle being shipped in the transport case 10. A quick release axle spindle (FIGS. 8C-D) is received in an appropriately sized bore 205 of the front fork mount 200. In the embodiment shown, the mount includes a bottom portion 201 and a removable top portion 215 that holds the quick release axle spindle in place in bore 205. In this embodiment, the quick release axle spindle is held within bore 205 in a fixed position by pressure on the spindle when top portion 215 is fastened onto bottom portion 210 using fasteners 220.

In an alternative embodiment, top portion 215 and bottom portion 210 may be a single piece, with bore 205 sized slightly larger than the diameter of the quick release axel spindle so that the spindle may be inserted through the bore 205. The spindle is held within bore 205 when a wheel is mounted on the spindle and a quick release skewer is threaded through the spindle and tightened.

A tab 225 configured to cooperate with the one or more grooves 95 in the base 15 is disposed at a bottom end 230 of bottom portion 210. Tab 225 is inserted into a groove in the base 15 to provide adjustment of the position of the fork mount along the lengthwise dimension of the base 15 to accommodate different sizes of bicycles. Tab 225 may be mushroom shaped, as shown in FIG. 6A, or it may take on other shapes, such as the T-shaped tab 235 shown in FIG. 6B. For example, the mushroom shaped tab 225 of FIG. 6A or the T-shaped tab 235 of FIG. 6B may be used where a single groove is formed in the base 15. Where a pair of rails are mounted on base 15 to provide for lengthwise adjustment of the position of front fork mount 200, the T-shaped tab 235 may be used. Both the mushroom shape and the T-shape may be characterized generally in that the shapes have a pin 227, 228 to which is mounted a head 228, 238 respectively.

In some embodiments, the bottom end 230 may include a portion 240 that is angled relative to the remainder of bottom end 230. This angulation provides a locking capability to hold the front fork mount in place on base 15 when the mount is in position to receive the front fork of a bicycle. This angulation allows the mount to lean backwards slightly, tilting the pin and head and locking the head against the top surface of the groove or rail. The position of the front fork mount may be adjusted by simply leaning the front fork mount 200 in an appropriate direction to "unlock" the front fork mount, and then sliding the front fork mount along the groove or rails to reposition the front fork mount.

FIGS. 7A-D illustrate embodiments of a rear drop out mount 300 that is similar to the front fork mount, but may be sized differently to ensure adequate clearance of various bicycle components above the base 15 of the transport case 10 when the bicycle is mounted to the base to prevent damage to those components.

Figures 7B, 7C, 7D:
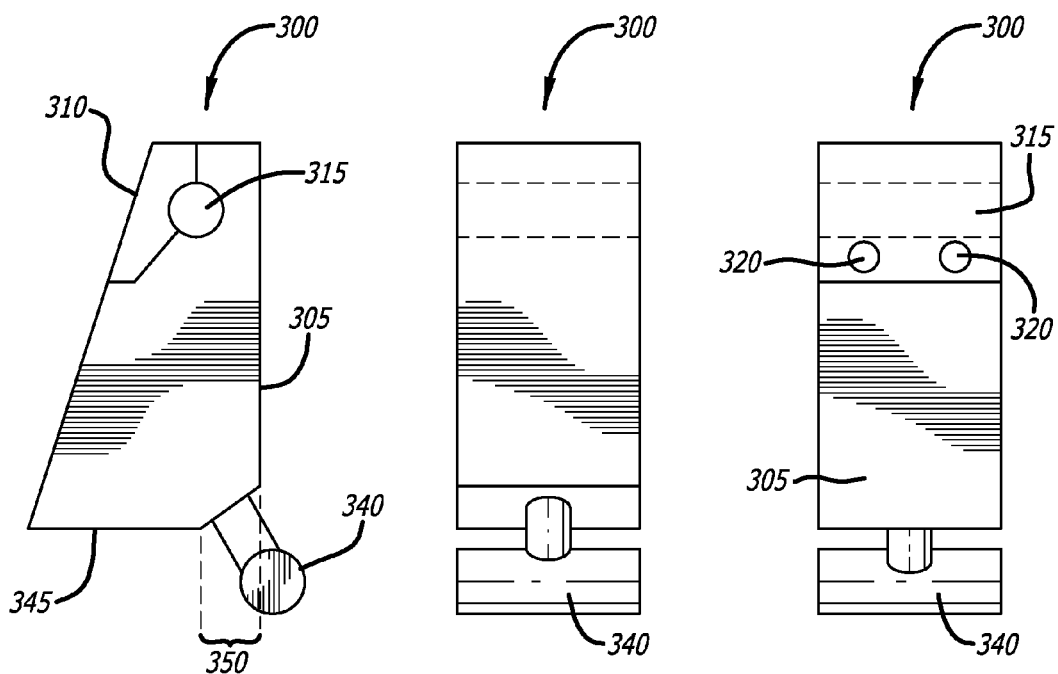
FIG. 7B is a side view of the embodiment of the rear mounting assembly of FIG. 7A.
FIG. 7C is a rear view of the embodiment of the rear mounting assembly of FIG. 7A showing, in phantom, a bore for receiving a spindle.
FIG. 7D is a front view of the embodiment of the rear mounting assembly of FIG. 7A.

FIG. 7A is a perspective view of one embodiment of the rear drop out mount 300 showing a bottom portion 305 and a top portion 310 that is fastened to the bottom portion 305 using fasteners 320, such as threaded screws or bolts, inserted through bores formed into top portion 310 and threaded into threaded holes formed in bottom portion 305. This arrangement allows top portion 310 to place pressure on a spindle that that is inserted through bore 315 (FIGS. 7B-D) to hold the spindle in place.

In an alternative embodiment, as described with reference to the front fork mount 200 above, rear drop out mount may be formed in a single piece, with bore 315 sized to be slight larger than the diameter of a spindle, allowing the spindle to be inserted into and extend through bore 315 in a loosely fitting manner. A quick release skewer 325 (FIG. 7A) may be inserted through the spindle to hold the spindle in place when lever 330 of the quick release spindle is actuated to tighten the quick release skewer.

Also shown in FIG. 7A is a faux cog 335 which may be mounted on the spindle, either fixedly, or rotatably and removably. Faux cog 335 provides for mounting of the chain of the bicycle being transported in such a manner as to put tension on the chain so that the chain does not move during transport, which would otherwise possible cause damage to the bicycle frame or other components.

In some embodiments, the quick release skewer 330 may include a round wheel- or gear-chain holder 335 for holding the chain of the bicycle to prevent movement of the chain during shipment of the transport case. This prevents the chain from marring the paint of the bicycle, or otherwise damaging the bicycle. A similar quick release mechanism is utilized to hold the front fork of the bicycle. However, as is well known in the art, a chain holder is not needed at the front fork mount.

The rear drop out mount 300 may be fixed to the base 15, or rear drop out mount 300 may include a tab 340 such as that previously described with reference to the front fork mount 200. This tab can be received into the groove of the base to allow adjustment of the position of the rear drop out mount along the lengthwise dimension of the base to accommodate different sizes of bicycles. A bottom end 345 of the rear drop out mount 300 may have an angled portion 350 to provide a "locking" capability to hold the rear drop out mount 300 in position on the base 15, in those embodiments where rear drop out mount 300 is not fixed to base 15, but is instead moveable. This angulation allows the mount to lean backwards slightly, tilting the pin and head of the tab and locking the head of the tab against the top surface of the groove or rail.

While the figures illustrate both front fork and rear drop out mounts as both having tabs, and thus both being adjustable, those skilled in the art will appreciate that only one of the mounts can be adjustable, with the other mount fixed, and still provide the amount of adjustment necessary to accommodate different sized bicycles. Similarly, in embodiments where only one of the mounts is moveable, the length of the groove or slot in the base that receives the tab of the moveable mount need only be as long as necessary to provide the amount of movement needed to accommodate a typical range of bicycle sizes. Also, while a mushroom-shaped tab is disclosed and shown in FIGS. 6 and 7, other shapes are possible, so long as they provide for retention of the tab within the groove or slot when the mount is moved.

FIG. 8 illustrates various embodiments of quick release mechanisms that are may be used in concert with the mounts of FIGS. 7A-D to hold the rear drop outs of the bicycle to the base 15 of the transport case 10. FIG. 8A is a side view of a quick release spindle 400 showing a chain holder 405 mounted to one end of a faux axle 410 having a bore 415 through which a hand actuated skewer commonly known in the art extends.

Figure 8A:
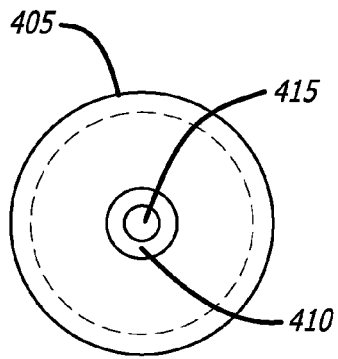
FIG. 8A is a side view of an embodiment of a quick release spindle including an embodiment of a chain holder configured for use with the rear mounting assembly of FIG. 7A.
Figure 8B:
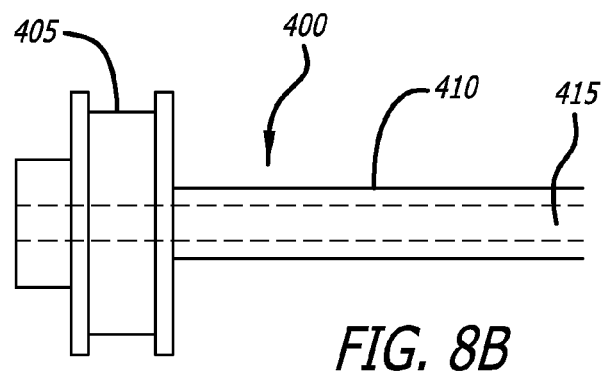
FIG. 8B is a side view of a quick release spindle for use with a track bicycle configured for use with the fork mount of FIG. 6A and the adjustable mount of FIG. 7 the rear mounting assembly of FIG. 7A.
Figure 8C:
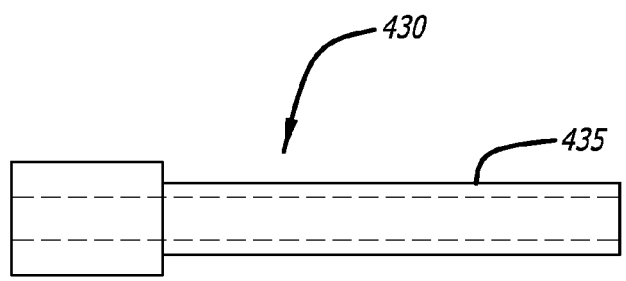
FIG. 8C is a side view of a quick release spindle for use with a road bicycle configured for use with the fork mount of FIG. 6A and the adjustable mount of FIG. 7A.
Figure 8D:
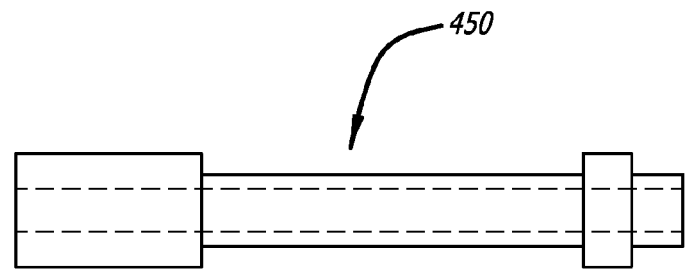
FIG. 8D is a side view of an alternative embodiment of a quick release spindle for use with a bicycle configured for use with the fork mount of FIG. 6A and the adjustable mount of FIG. 7A.

FIG. 8B shows an embodiment of a spindle 430 having a hollow faux axle 435 that is designed for use with a track bicycle. Its length is generally shorter than a spindle 450 that is used for mounting a road bicycle, as shown in FIG. 8C, due to the increased length needed to accommodate the wider separation between chain stays commonly found on a bicycle having a rear cassette and derailleur system for changing gears, unlike a track or fixed gear bicycle which typically has only one cog and lacks a derailleur.

Figure 9:
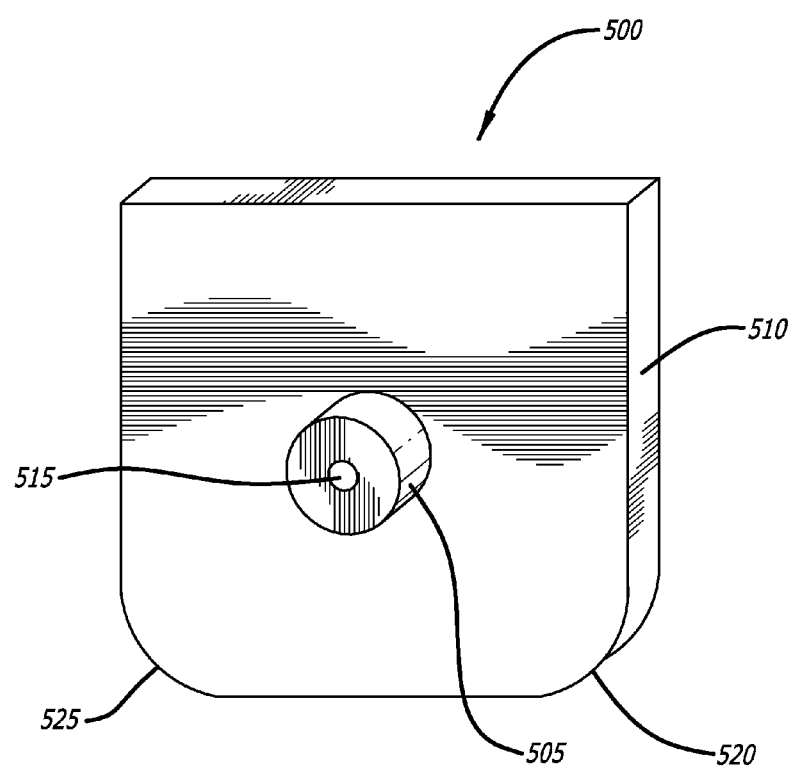
FIG. 9 is a view of an embodiment of a fixture that is attached to an axle or quick release of a wheel and configured to cooperate with a fixture mounted on one side of the bicycle transport case to hold the wheel when the bicycle is being shipped.

Referring again to FIG. 5A, there is shown an embodiment of wheel mounting brackets 180, 185 mounted to the inside of the second side 35 of the transport case 10. These brackets are configured to accept a fixture 500 attached to an axle or quick release of a wheel, as is shown in FIG. 9. The fixture of FIG. 9 includes a central portion 505 that projects above a main body 510 of the fixture. Central portion 505 includes a bore 515 that extends through the fixture. The main body 510 is sized and configured to engage the wheel mounts 180, 185 mounted to the second side 35 of the transport case 10 in such a manner as to hold a bicycle wheel in place in the transport case 10.

In some embodiments, the bore 515 of central portion 505 may be threaded and configured to thread onto a wheel axle. Alternatively, the bore may be threaded to accept the threaded end of a quick release skewer inserted through a hollow axle of a bicycle wheel, (hollow axles are common on most bicycles, as they allow a quick-release skewer to be used to removably attach the wheel to the drop outs of the fork and frame). Once the fixture 500 is threaded onto the wheel axle or quick release of the wheel, the main body 510 of the fixture is inserted into a slot 182, 187 of the wheel mounting bracket 180, 185 respectively (FIG. 5A), and is maintained within the wheel mounting bracket through the cooperation of the main body and wheel mounting bracket to retain the wheel in the bracket. The slot of the wheel mounting bracket (FIG. 5A) may also be configured so that as the projecting central portion 505 of the fixture 500 is slid into the slot 182, 187, the shape of the slot cooperates with the shape of the projecting central portion of the fixture to lock the fixture in place in the wheel mounting bracket.

In one embodiment, two adjacent corners 520, 535 along one side of main body 510 may be rounded, or otherwise configured, to improve the ease of insertion of fixture 500 into wheel mounting brackets 180, 185. Alternatively, main body 510 may have a rounded shape.

The bicycle transport case may be formed from metal, wood, plastic, or any combination of these. For example, the outer sides and surfaces of the case may be formed of plastic, and the base may have a metal insert forming a foundation for the groove and mounts to be mounted thereon. Alternatively, the base may be formed entirely of metal. Where a suitable plastic is used for the base, the grooves may be formed in the plastic and used for mounting the fork and rear drop out mounts, while reducing the overall weight of the transport case.

While the bicycle transport case has been described as having the wheel mounts for the bicycle's wheels mounted on one of the sides (specifically, the second side) of the case, other embodiments are possible where the width dimension of both the first and second sides is sufficient to allow a wheel, or more than one wheel, to be mounted on each side. In those embodiments, a protective panel could be included for each side to isolate the wheel or wheels mounted on each side to be isolated from a bicycle mounted on the base between the two sides. In other embodiments, the base is wide enough to accommodate at least two bicycle frames, and wheel mounts are provided on each of the first and second sides for mounting the wheels of both bicycles.

While several particular forms of the invention have been illustrated and described, it will be apparent that various modifications can be made without departing from the spirit and scope of the invention.

I claim:

1. A bicycle transport case, comprising:
   a base having at least two wheels mounted at a bottom surface at one end of the base for rolling the case across a surface, the base also having a channel formed in a top surface of the base;
   a fork mount mounted to the base, the fork mount configured to releasably engage fork drop outs of a bicycle;
   a rear frame mount having a top end and a bottom end, the top end configured to engage rear drop outs of a bicycle frame in a releasable manner, the bottom end of the rear frame mount movably mounted to the base to provide for movement of the rear frame mount to position the rear frame mount to accommodate different sizes of bicycle frame;
   a first pin having a first head, the first pin extending from the bottom end of the rear frame mount, the first head having a width dimension larger than a width dimension of the first pin such that when the first head of the first pin is inserted into the channel, the channel engages the first head to maintain the first head in the channel while still allowing the first pin to move in a longitudinal direction along the base;
   at least one hook providing a tie down surface for securing accessories to the base;
   a first side releasably mountable to the base, the first side also having a pair of side panels and a top panel defining a cavity open on one side to partially enclose the bicycle mounted to the base; and
   a second side releasably mountable to the base, the second side also having a pair of side panels and a top panel defining a cavity open on one side to partially enclose the bicycle, the first and second sides cooperating to completely enclose the bicycle when the bicycle transport case is in a closed condition, the second side including at least one wheel mount for releasably mounting a wheel removed from the bicycle to the second side, and also include a cushioning layer releasably mounted to the second side and disposed within the cavity to isolate the wheel from the bicycle mounted to the base.

2. The bicycle transport case of claim 1, wherein the front fork mount is removably mounted to the base.

3. The bicycle transport case of claim 2, wherein the channel is configured to receive a second head of a second pin extending from a bottom end of the front fork mount, the second head having a width dimension larger than a width dimension of the second pin such that when the second head of the second pin is inserted into the channel, the channel engages the second head to maintain the second head in the channel while still allowing the second pin to move in a longitudinal direction along the base to provide for adjustment of the front fork mount to accommodate different bicycle sizes.

4. The bicycle transport case of claim 1, further comprising a wheel mount fixture configured to engage the wheel mount to hold the bicycle wheel in place within the transport case.

5. The bicycle transport case of claim 1, wherein four wheels are mounted adjacent four corners of the base.

6. A bicycle transport case, comprising:
- a base having at least two wheels mounted at a bottom surface at one end of the base for rolling the case across a surface, the base also having a channel;
- a fork mount slidably mounted to a top surface of the base, the fork mount configured to releasably engage fork drop outs of a bicycle;
- a rear frame mount mounted to a top surface of the base and configured to engage rear drop outs of a bicycle frame in a releasable manner;
- a first pin having a first head, the first pin extending from a bottom end of the rear frame mount, the first head having a width dimension larger than a width dimension of the first pin such that when the first head of the first pin is inserted into the channel, the channel engages the first head to maintain the first head in the channel while still allowing the first pin to move in a longitudinal direction along the base to provide for adjustment of the rear frame mount to accommodate different bicycle sizes;
- at least one hook providing a tie down surface for securing accessories to the base;
- a first side releasably mountable to the base, the first side also having a pair of side panels and a top panel defining a cavity open on one side to partially enclose the bicycle mounted to the base; and
- a second side releasably mountable to the base, the second side also having a pair of side panels and a top panel defining a cavity open on one side to partially enclose the bicycle, the first and second sides cooperating to completely enclose the bicycle when the bicycle transport case is in a closed condition, the second side including at least one wheel mount for releasably mounting a wheel removed from the bicycle to the second side, and also include a cushioning layer releasably mounted to the second side and disposed within the cavity to isolate the wheel from the bicycle mounted to the base.

7. The bicycle transport case of claim 6, further comprising a second pin having a second head extending from a bottom end of the front fork mount, the second head having a width dimension larger than a width dimension of the second pin such that when the second head of the second pin is inserted into the channel, the channel engages the second head to maintain the second head in the channel while still allowing the second pin to move in a longitudinal direction along the base to provide for adjustment of the front fork mount to accommodate different bicycle sizes.

8. The bicycle transport case of claim 6, further comprising a wheel mount fixture configured to engage the wheel mount to hold the bicycle wheel in place within the transport case.

* * * * *